United States Patent [19]

Miyaoka et al.

[11] Patent Number: 4,757,466

[45] Date of Patent: Jul. 12, 1988

[54] HIGH SPEED DATA PROCESSING SYSTEM AND METHOD

[75] Inventors: Shinichiro Miyaoka; Akira Muramatsu, both of Kawasaki; Motohisa Funabashi, Sagamihara, all of Japan

[73] Assignee: Hitachi, Ltd., Tokyo, Japan

[21] Appl. No.: 769,306

[22] Filed: Aug. 26, 1985

[30] Foreign Application Priority Data

Sep. 7, 1984 [JP] Japan .............................. 59-186316

[51] Int. Cl.⁴ ................................................ G06F 7/38
[52] U.S. Cl. ..................................... 364/736; 364/200
[58] Field of Search ......... 364/726, 736, 200 MS File

[56] References Cited

U.S. PATENT DOCUMENTS

| | | | |
|---|---|---|---|
| 3,343,135 | 9/1967 | Freiman et al. | 364/736 |
| 3,936,806 | 2/1976 | Batcher | 364/200 |
| 3,962,706 | 6/1976 | Dennis et al. | 364/900 |
| 4,065,808 | 12/1977 | Schomberg et al. | 364/200 |
| 4,149,240 | 4/1979 | Misunas et al. | 364/200 |
| 4,153,932 | 5/1979 | Dennis et al. | 364/200 |
| 4,306,286 | 12/1981 | Cocke et al. | 364/200 |
| 4,310,879 | 1/1982 | Pandeya | 364/200 |
| 4,486,850 | 12/1984 | Hyatt | 364/726 |
| 4,587,626 | 5/1986 | Gray | 364/726 |
| 4,656,580 | 4/1987 | Hitchcock, Sr. et al. | 364/200 |

Primary Examiner—Gary V. Harkcom
Assistant Examiner—Long T. Nguyen
Attorney, Agent, or Firm—Antonelli, Terry & Wands

[57] ABSTRACT

A processing method and apparatus for providing high speed computations including an exchange network for discriminating a first processing node which can execute a predetermined arithmetic operation. The processing node being capable of executing the arithmetic operation and determining a second processing node to which the output of the executed node is to be applied. The invention may include a plurality of first and second processing nodes in parallel to enable high speed computations.

5 Claims, 3 Drawing Sheets

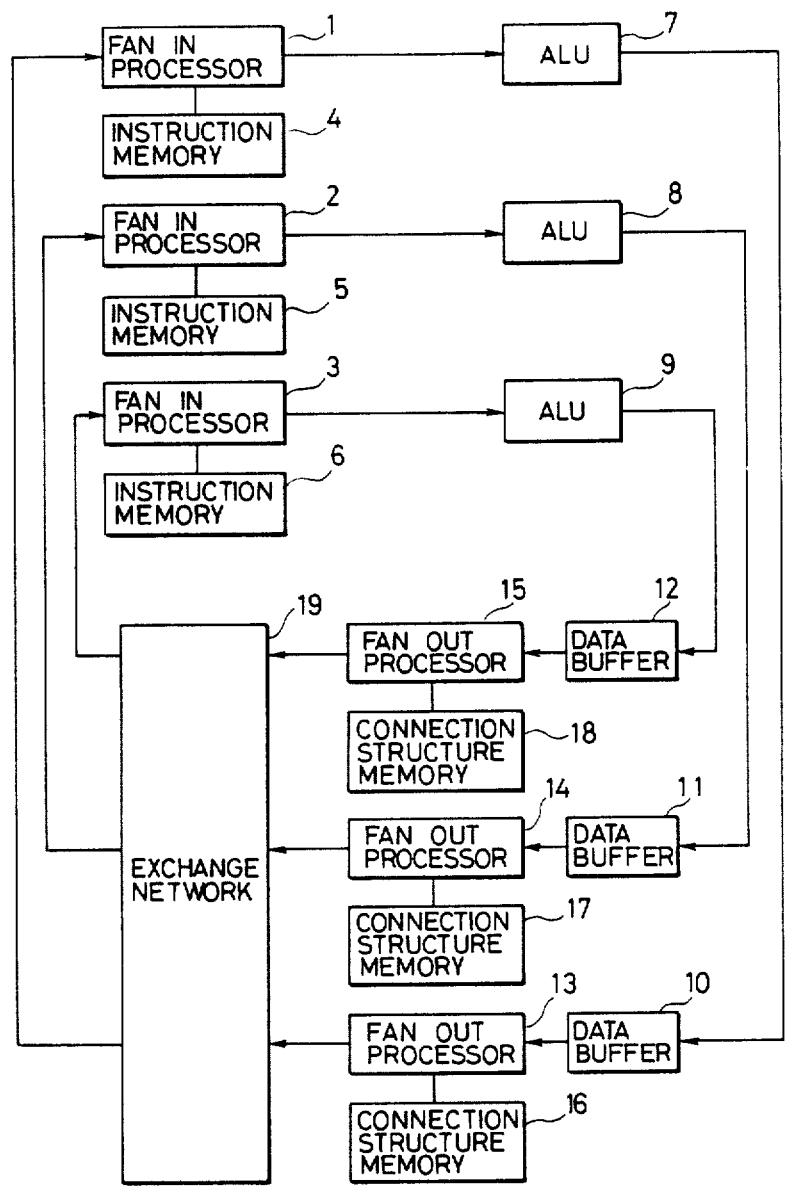

HIGH SPEED DATA PROCESSING SYSTEM AND METHOD

BACKGROUND OF THE INVENTION

1. Field of the Invention

The present invention relates to a numerical simulation in a real time system and particularly to a high speed processing apparatus which is suitable for computing a system having sparse and irregular characteristics such as an electronic circuit, a logic circuit, a structure analysis, a tidal current computation or the like.

2. Description of the Prior Art

As a computer for rapidly performing a numerical computation, there exists super computers and array processors, however they have the following problems.

(1) In case of accomplishing a computation in a sparse or irregular system as described above, the efficiency is remarkably reduced because of shortened vector length.

(2) It is difficult to increase the degree of parallel processing so as to speed up the computation.

Though there are some realized devices in a data flow machine (Mizoguchi, et al.: Image processing processor TIP-1, Shingakugiho: EC81-59), there is a limit to the speedup because the data reading section is series-connected.

SUMMARY OF THE INVENTION

It is an object of the present invention to provide a processing apparatus having a parallel computing capability which can rapidly compute complicated address computations due to irregular structures, which are not suited for a vector computation in a super computer or the like since it is difficult to increase vector length because of the sparse structure.

It is possible to express the processing in a numerical computation using a data flow graph. The data flow graph denotes a graph where a processing instruction and a data flow are respectively expressed as nodes and arcs. For example, (a) LU resolution and (b) the solving of a trigonomeric equation are respectively described using the data flow graphs of FIGS. 1(a) and (b). In case of assembling all the data of the arcs to be input to a certain node, the operation of the node is understood to be realized. Thus, it is understood that this system can naturally express parallel characteristics existing within the computation in comparison with a system using a vector which is employed in a super computer or the like.

As features of the data flow graph in numerical computation, the following three respects can be cited.

(i) The kinds of nodes are limited to the four rules of arithmetic.
(ii) There exist no loops from a view of a graph.
(iii) There is no case of converting a value of the input terminal ($a_{11}$, $a_{31}$, . . . in FIG. 1(a)).

Accordingly, the present invention has a feature with respect to designing the speedup of the computation by utilizing the fact that it is possible to realize a computation in parallel in a simple network type of operation (an operation such as tracing the connecting relation among nodes) having no storage function in the arc as described below.

(i) The input data are assembled, that is, the operation-executed nodes are discriminated.

(ii) The operations of these first nodes (only the four rules of arithmetic) are executed.

(iii) The nodes to which the outputs of the first nodes are searched and the processing results of the first node are set as the input data of the nodes to which the results of the first nodes are output.

In general, there are many nodes assembling the input data at the same time and these nodes can be executed in parallel.

BRIEF DESCRIPTION OF THE DRAWINGS

FIG. 2 is a block diagram showing the whole processing apparatus.

DETAILED DESCRIPTION OF THE PREFERRED EMBODIMENTS

Figure 1B:
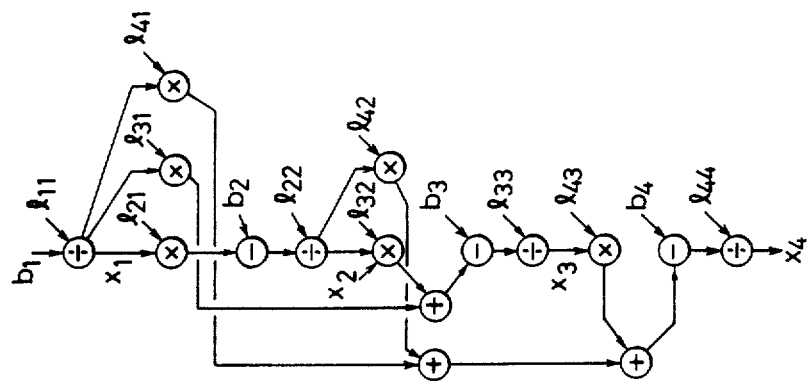
FIGS. 1(a) and 1(b) are views showing examples of a data flow graph.
Figure 1A:
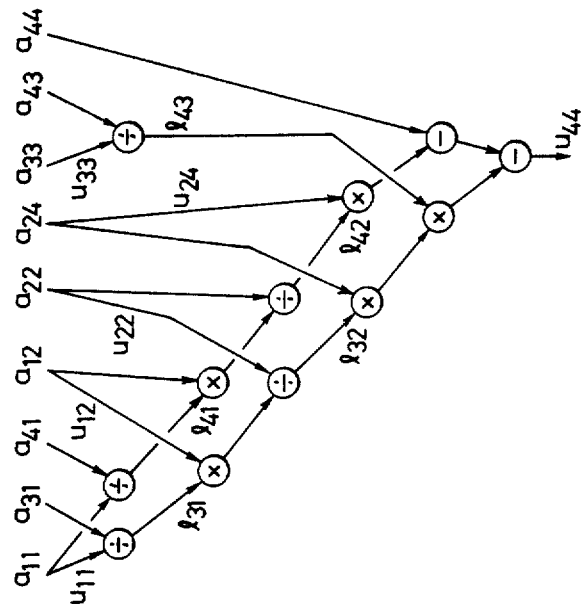

Hereinafter, the embodiment of the present invention is described with reference to FIG. 2.

In the present embodiment, the processing apparatus is wholly comprised of three-fold loops. The first (or the second or the third) loop is composed of a fan-in processor 1 (2, 3) for assembling the input data of the nodes and then sending them to an arithmetic unit, the arithmetic unit 7 (8, 9) for executing the four rules of arithmetic, a data buffer 10 (11, 12) operating on the FiFO (First In First Out) principle a fan-out processor 13 (14, 15) and an exchange network 19. The fan-in processors 1 to 3 are respectively connected to instruction memories 4 to 6. The fan-out processors 13 to 15 are respectively connected with connection structure memories 16 to 18.

The data flow graph is expressed by 2-input-and-multiple-output nodes (it is generally possible to arrange the graph in this way) and is divided by the same number of subgraphs with the multiplicity of loops. The data in relation to the kinds of instructions and the connection structure is stored in the memories corresponding to the subgraphs. In the present embodiment, there are shown 3 subgraphs and the data such as the kinds of instructions and the like are dispersed throughout the instruction memories 4 to 6 and the data in relation to the connection structure is dispersed throughout the memories 16 to 18.

Figure 3A:
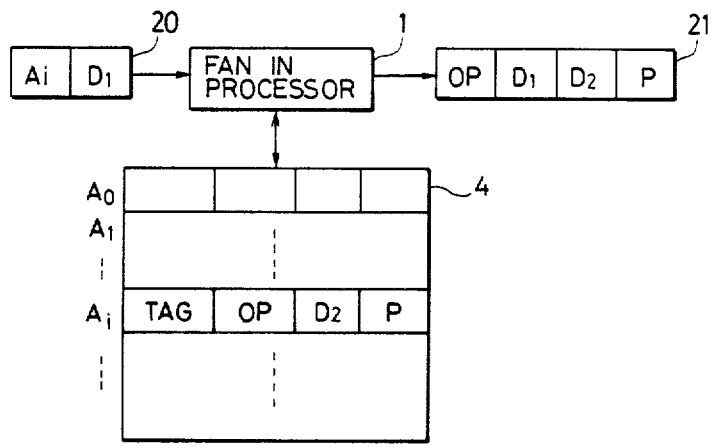
FIGS. 3(a) and 3(b) are block diagrams showing a memory.

Next, the arrangements of the instruction memories 4 to 6 and the connection structure memories 16 to 18 are described in detail. As shown in FIG. 3(a), the instruction memory 4 stores four data, TAG, OP, $D_2$ and P at an address having node number $A_i$. TAG serves to take a value of 1 when either value of two inputs of a node is established and to take a value of 0 when neither of two inputs are established or the operation has already terminated. OP denotes an operation code showing the kinds of operations (four rules of arithmetic). $D_2$ shows the value in case of establishing either value of the inputs. P denotes a pointer showing a head address of the connection structure 16 in which the number (in general, there are numerous nodes) of the output node corresponding to the node inputs are stored. The connection structure memory 16 serially stores the number of a plurality of nodes to which the node outputs and the head address thereof is pointed by the pointer P stored in the instruction memory 4. The final address thereof can be discriminated by an END flag in the stored data.

The exchange network 19 has a function of distributing the data input in accordance with the assigned address and is comprised of a multi-stage switch network, a crossbar switch or the like.

The operation is described as an example of a first loop with reference to FIGS. 2 and 3. As shown in FIG. 3(a), the fan-in processor 1 receives the combination 20 of the node number $A_i$ and the input address $D_1$ from the exchange network 19 and reads TAG from the address $A_i$ of the instruction memory 4. In case TAG is 0, $D_1$ is written on the corresponding addrss of the instruction memory 4 as $D_2$ so as to convert TAG from 0 to 1. When TAG is 1, two input data are assembled. Thus, $D_2$ is read out and the combination 21 of (OP, $D_1$, $D_2$, P) is sent to the arithmetic unit 7 so as to convert TAG from 1 to 0.

The operation arithmetic unit 7 serves to perform the operation OP on $D_1$ and $D_2$ and the combination 23 of the processing result D and the pointer $P_j$ is sent to the data buffer 10.

Figure 3B:
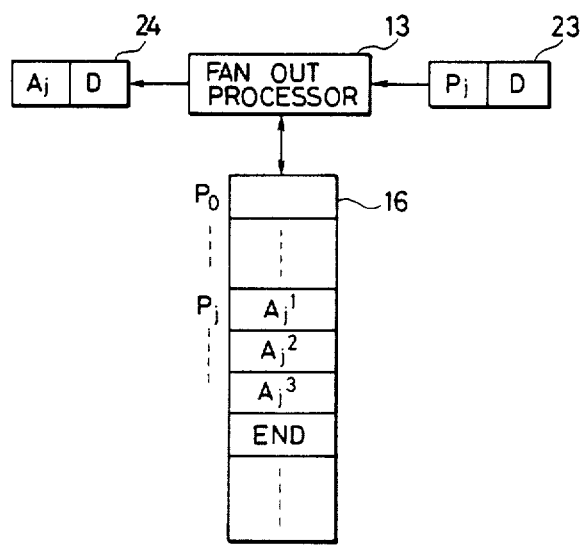

As shown in FIG. 3(b), the fan-out processor 13 serves to pick up the combination 23 of ($P_j$, D) from the data buffer 10 in order of arrival and to read out the number $A_j$ of the nodes where the output is to be applied based on $P_j$ as an address from the connection structure memory 16. Further, it serves to input the combination 24 of the number $A_j$ of the nodes where the output is applied and the processing result data D (which becomes the input data of the nodes where the output is applied.) to the exchange network 19. Since there ordinarily exists a plurality of nodes where the output is applied, the fan-out processor 13 continues the above-stated process until the final flag by repeatedly incrementing an address by one.

The exchange network 19 serves to decode the number $A_j$ of the nodes and to send the combination of ($A_j$, D) to either one of the fan-in processors 1 to 3. Namely, said data is sent to the fan-in processor connected with the memory storing the information at node $A_j$.

The above-mentioned processing is executed along a loop like a pipeline. It means that the fan-in processor, the arithmetic unit, the fan-out processor and the exchange network respectively and simultaneously execute the processings in relation to respective nodes.

Hereinbefore, the operation has been described as related to the first loop, but the operations of the second and the third loops are quite similar to that of the first loop. These loops provide respective computations in parallel as carrying out the data exchange through the exchange network. If the degree of parallel processing is to be increased, such can be realized by increasing the loops in number without concretely converting the arrangement.

Though FIG. 2 does not describe it, the arithmetic unit 7 (8, 9) is connected to the host computer (which can utilize the microprocessor or the same level of device). The host computer serves to read out the data load and the processing result to the memory. The termination of the operation is at the time point when no input has appeared to the fan-in processor.

According to the present invention, since the parallel relation existing in the problem can be drawn out maximally, the present device can accomplish the computation at high speed in relation to an irregular problem or that having a sparse configuration which a vector computer such as a super computer or the like is not good at operating. For example, even the super computer whose maximal efficiency is 800 MFLOS can display only 10 to 30 MELOPS which is a fraction of several tens of maximal efficiency with respect to a LU resolution of a sparse and irregular matrix. In contrast to this, the efficiency of the present invention surpasses that of a super computer, that is, 40 MELOPS with 8 loops and 80 MELOPS with 16 loops. However, this is based on the assumption that the arithmetic unit employs a 10 MELOPS of floating point processor and the machine cycle is 100 ns.

Further, in the present invention there is no need for a great deal of hardware because of the definition of the objects, and it is easy to expand the arrangement and to increase the degree of parallel processing.

What is claimed is:

1. A high speed data processing system for processing data in accordance with a data flow graph including nodes corresponding to instructions to be executed, said system comprising:

at least one first means for discriminating a node which includes all available data to be executed, based on an indication code stored in a first memory, and for outputting an instruction corresponding to said node, said instruction including an operation code to indicate the kind of said instruction, said available data and a pointer code;

at least one second means for executing said instruction, and for outputting a result of said execution and said pointer code;

at least one third means for receiving said result of said execution and said pointer code, and for addressing a second memory based on said pointer code, said second memory storing a number of at least one receiving node with is to receive output data from said node at an address indicated by said pointer code, and for outputting the number of said at least one received node and said result of said execution; and fourth means for relaying the output of said at least one third means to said at least one first means.

2. A high speed data processing system according to claim 1, wherein said indication code indicates the availability of said data to be processed, said first memory further storing said operation code, the value of one data to be executed, and said pointer code at an address which is indicated by said third means.

3. A high speed data processing system according to claim 1, wherein at least two sets of said first, second and third means are connected in parallel to said fourth means.

4. A high speed data processing system according to claim 3, wherein said fourth means comprises an exchange network for relaying said output of said at least one third means to a predetermined one of said at least one first means.

5. A high speed data processing method for processing data in accordance with a data flow graph including nodes corresponding to instructions to be executed, said method comprising the steps of:

discriminating a node which includes all available data to be executed based on an indication code indicating the availability of said data;

outputting an instruction corresponding to said node including an operation code to indicate the kind of said instruction, said available data and a pointer code;

executing said instruction;

outputting a result of said executing step and said pointer code;

generating at least one receiving node for receiving said result based on said pointer code; and outputting said result to said at least one receiving node for further processing.

* * * * *